United States Patent [19]

Tomita et al.

[11] Patent Number: 5,403,611
[45] Date of Patent: Apr. 4, 1995

[54] ICE CREAM AND PROCESS FOR PRODUCING THE ICE CREAM

[75] Inventors: Mamoru Tomita; Sadayuki Kokubo, both of Yokohama; Kazumi Sakurai, Hadano; Michio Ikeda, Yokohama; Mizuo Tsuda, Yokohama; Tsutomu Kudo, Yokohama, all of Japan

[73] Assignee: Morinaga Milk Industry Co., Ltd., Tokyo, Japan

[21] Appl. No.: 6,533

[22] Filed: Jan. 21, 1993

[30] Foreign Application Priority Data

| Jan. 22, 1992 | [JP] | Japan | 4-031397 |
| Apr. 30, 1992 | [JP] | Japan | 4-109155 |
| Nov. 11, 1992 | [JP] | Japan | 4-324688 |

[51] Int. Cl.$^6$ .......................... A23G 9/02; A23G 9/20
[52] U.S. Cl. ...................... 426/565; 62/342; 99/455
[58] Field of Search ........ 426/474, 524, 909, 564–568; 99/455; 62/342, 343

[56] References Cited

U.S. PATENT DOCUMENTS

| 1,407,044 | 2/1922 | Thompson | 62/343 |
| 1,783,865 | 12/1930 | Vogt | 62/343 |
| 1,882,660 | 10/1932 | Glauser | 62/343 |
| 2,131,511 | 9/1938 | Gray et al. | 62/342 |
| 2,576,842 | 11/1951 | Lehner | 426/565 |
| 2,867,994 | 1/1959 | Wakeman | 62/343 |
| 3,576,648 | 4/1971 | Goodman et al. | 426/565 |
| 4,129,389 | 12/1978 | Wakeman et al. | 62/343 |
| 4,162,127 | 7/1979 | Wakeman et al. | 62/343 |

OTHER PUBLICATIONS

Ice Cream and Related Products, 1961, pp. 142–143; 158–159; 204–205; 308–309, J. H. Frandsen, et al.
Ice Cream, 1986, pp. 69; 72; 234; 242–245; 292; 296, W. S. Arbuckle.
Japan Dairy Industry Technology Society: Ice Cream & Sherbet, 1964, p. 4.
Ice Cream Handbook, 1972, p. 254, Keiji Hanzawa.
A Guide to Diary Technology, vol. 1, 1975, pp. 359–360, Kinjiro Sukegawa.
Journal of Dairy Science, vol. 70, No. 3, Mar. 1987, pp. 555–558, Robert J. Baer, et al., "Determination of Ice Cream Mix Freezing Points: A Comparison of Methods".
Ice Cream Journal, vol. 97, Apr. 1990, pp. 6–9; 107.
Ice Cream, 1973, pp. 195–197, K. A. Hyde, et al.
Production of Ice Cream, 1960, pp. 99–100, Masahisa Maeno.
Journal of Diary Science, vol. 72, No. 1, Jan. 1989, pp. 18–29, H. D. Goff, et al., "Action of Emulsifers in Promoting Fat Destabilization During the Manufacture of Ice Cream".
The Ice Cream Review, vol. 42, May 1959, pp. 36–46, J. J. Kloser, et al., "A Study of Some Variables that Effect Fat Stability and Dryness in Ice Cream".
International Diary Congress, vol. C, Section VI:I, 1962, pp. 61–71, M. G. John, et al., "The Effect of Stabilisers and Emulsifying Agents upon the Properties of Ice Cream".
Technical Handbook of Milk Industry, vol. 1, 1977, pp. 216;234;244;479, Hiromachi Hayashi.
Publication by Agricultural Experimentation Station of Iowa State College of Agriculture and Mechanic Arts, Bulletin No. 180, M. Mortensen, pp. 260–283, May 1918.

Primary Examiner—Joseph W. Drodge
Attorney, Agent, or Firm—Oblon, Spivak, McClelland, Maier & Neustadt

[57] ABSTRACT

An ice cream having a property of excellent meltdown in the mouth, a fat content of 5 to 18% by weight and an overrun of 10 to 150% by weight, containing air cells of 60 μm or more in diameter at a ratio of at least 80% of the total air cells, is disclosed. Further, a process for producing an ice cream having a property of excellent softness even at a freezing temperature, which comprises incorporating air into an ice cream mix in a first cylinder of the cylinders of two linked continuous freezers to give an overrun, transferring the mix to a second cylinder at a specific temperature, and then mixing and kneading the mix in the second cylinder without giving any additional overrun. In the process for production, an apparatus characterized by having a pipeline linking an apparatus for supplying the rest of an ice cream mix to a pipeline linking the first cylinder and the second cylinder of the cylinders of 2 linked continuous freezers is used.

10 Claims, 2 Drawing Sheets

ICE CREAM AND PROCESS FOR PRODUCING THE ICE CREAM

BACKGROUND OF THE INVENTION

Field of the Invention

The present invention relates to an ice cream having a property of excellent meltdown in the mouth, containing air cells with relatively large diameters uniformly, and a process for producing the same.

Moreover, the present invention relates to processes for producing an ice cream having a property of excellent softness even at a freezing temperature, particularly, processes for producing an ice cream which has a property of excellent softness and is capable of being spooned up easily by a spoon, an ice cream disher and the like, even immediately after being taken out of a freezer, without the excessive addition of antifreezing agents such as sugar, salt, alcohol and the like to an ice cream mix.

In addition, the present invention relates to a process and apparatus for producing an ice cream, characterized by supplying a part of an ice cream mix additionally, and the said process for producing an ice cream comprises freezing a part of an ice cream mix in a first cylinder of the cylinders of two linked continuous freezers, drawing the frozen ice cream mix, supplying the rest of the ice cream mix to a pipeline between the first cylinder and a second cylinder of the said cylinders, and then refreezing the ice cream mix in the second cylinder, and the said apparatus for producing an ice cream is characterized by having a pipeline linking an apparatus for supplying an ice cream mix to a pipeline linking the first cylinder and the second cylinder of the cylinders of two linked continuous freezers.

In the present specification, "an ice cream" means a general term for an ice cream, ice milk, lacto-ice and sherbet defined in the Act of Ministry of Health and Welfare No. 52, "Ministerial ordinance regarding the component standards of milk and dairy products", issued on Dec. 27, 1951, and the percentage means % by weight unless otherwise noted, except the percentage of the distribution of the particle size of air cells.

Description of the Prior Art

Generally, ice creams are classified into ice creams and sherbet, and ice creams are further classified into an ice cream, ice milk and lacto-ice according to the contents of milk fat and non-fat milk solids. Ice creams are generally produced by freezing a pasteurized ice cream mix containing 3 to 20% of milk fat, vegetable fat and oil or a mixture thereof, 3 to 12% of non-fat milk solids, 8 to 20% of sugar, and if necessary, a small amount of a stabilizer, an emulsifier, a color, flavors and the like, by incorporating air into a continuous freezer to give an overrun of 10 to 150%, filling a container with the resultant mixture, and then hardening it [1) Hiromichi Hayashi: A Survey of Dairy Industry Technology, page 216, Dairy Farming Technology Spread Society, 1977, 2) Hiromichi Hayashi: A Survey of Dairy Industry Technology, page 234, Dairy Farming Technology Spread Society, 1977, 3) Kinjiro Sukegawa: A Guide to Dairy Technology, page 359, Dairy Farming Technology Spread Society, 1975].

In a process for producing an ice cream, the total flavor of a final product is determined according to the creaminess, iciness, a degree of sweetness, smoothness, a property of meltdown in the mouth, hardness and the like of the said ice cream which are caused by the conditions of the production, such as blending proportions of materials, freezing condition and hardening condition and the like.

It has been known that the structure of the tissue of ice creams are formed by aggregates due to the churning of fat globules together with ice crystals and other solids, and that its structural strength has influence on the dryness and a property of meltdown in the mouth of ice creams [4) M. G. John: International Dairy Congress, vol. C, Section VI:1, page 61, 1962, 5) J. J. Kloser: The Ice Cream Review, vol. 42, page 36, 1959, 6) H. D. Goff: Journal of Dairy Science, vol. 72, page 19, 1989].

Today, according to consumers' needs for high-grade products, ice creams with a high content of fat and a property of excellent meltdown in the mouth are required. Generally, in order to satisfy such a requirement, ice creams with a low content of fat and a low overrun have been produced at a high freezing temperature in a freezer. However, the ice creams produced according to the said ordinary methods are poor in thickness and strong in iciness, and thus they are low-grade products.

On the other hand, when ice creams with a high content of fat and a high overrun are produced at a low freezing temperature in a freezer, the ice creams having strong thickness and creaminess are obtained, but a property of meltdown in the mouth of the said ice creams becomes worse [7) H. D. Goff: Journal of Dairy Science, vol. 72, page 25, 1989].

As mentioned above, it has been considered that thickness due to fat is contradictory to a property of meltdown in the mouth [8) Masahisa Maeno: Producion of Ice Cream, page 99, Korin Shoin, 1960], and thus it has been difficult to reconcile both.

As mentioned above, ice creams are generally classified into ice creams, ice milk, lacto-ice and sherbet according to the contents of milk fat and milk solids. They are further classified into various kinds and types according to whether or not one contains air, shapes of containers, flavors and the like. Thus, the total flavor of an ice cream is characterized by creaminess, iciness, sweetness, smooth feeling, a property of smoothness and excellent softness, and the like. Especially, a property of softness is considered one of the most important characteristics of an ice cream.

Recently, the number of consumers who are fond of ice creams having a property of excellent softness such as soft cream and gelato filled into a cone-made cup or a container sold at a shop tends to increase. Generally, they tend to require a property of excellent softness regarding ordinary ice creams as well.

The main factors having influence on the property of excellent softness of an ice cream include formulation ingredients, overruns, methods of production, conditions of temperature under which ice cream is consumed, and the like. Except soft cream and gelato, which are sold at a high temperature relatively, ordinary ice creams are stored in a showcase at −15° to −25° C., and sold, and then preserved in a household freezer at −15° to −20° C., and the temperature of ice creams consumed is −12° to −18° C. usually [9) K. A. Hyde: Ice Cream, page 308, Churchill Livingstone, 1973, 10) K. A. Hyde: Ice Cream, page 195, Churchill Livingstone, 1973, 11) Ice Cream Journal, No. 97, page 6, 1990].

As a method for giving a property of excellent softness to ice cream at a freezing temperature of −12° to −18° C. under which ordinary ice creams are consumed, a method can be mentioned, as a general one, which comprises adding sugar, salt, alcohol and the like to an ice cream mix to lower its freezing point, by which the said mix becomes hard to freeze [12] W. S. Arbuckle: Ice Cream, ed. 4, page 234, 1986].

Such methods applying an antifreezing effect of the said additive components have difference in their effects according to the molecular weights of materials to be added to an ice cream mix. For example, when sugars are used, glucose and fructose with a small molecular weight have a marked effect than sucrose with a large molecular weight [13] W. S. Arbuckle: Ice Cream, ed. 4, page 69, 1986, 14) W. S. Arbuckle: Ice Cream, ed. 4, page 72, 1986, 15) R. J. Baer: Journal of Dairy Science, vol. 70, No. 3, page 555, 1987, 16) Kinjiro Sukegawa: A Guide to Dairy Technology, page 360, Dairy Farming Technology Spread Society, 1975]. Salt and alcohol have the same effect. So far, a propety of excellent softness has been given to ice cream by adding such materials with a small molecular weight to an ice cream mix.

However, the addition of sugar and the like to an ice cream mix may have important influence on the flavor and sweetness of ice cream. The use of sugar in a large amount for the purpose of giving a property of excellent softness sufficiently to an ice cream results in excess sweetness [17] Hiromichi Hayashi: A Survey of Dairy Industry Technology, page 244, Dairy Farming Technology Spread Society, 1977]. And the excess use of salt and alcohol spoils the flavor of an ice cream remarkably. Thus, the use of them is restricted.

In addition to the method in which the said various components are added to an ice cream mix, there is another method of giving a property of excellent softness to an ice cream by incorporating air into an ice cream mix to give an overrun. When an overrun exceeds its ordinary range and an exessive overrun is given, however, mouthfeel of an ice cream becomes worse remarkably [18] Keiji Hanzawa: Ice Cream Handbook, page 254, 1972]. Accordingly, the said method is difficult to be employed generally.

Next, speaking about the preparation of an ice cream mix, it has been ordinarily prepared by mixing all materials except volatile ones such as flavors, dissolving the resultant mixture, pasteurizing it at a high temperature and homogenizing it. The whole of the said mix has been prepared in a uniform state [19] Hiromichi Hayashi: A Survey of Dairy Industry Technology, page 234, Dairy Farming Technology Spread Society, Dairy Farming Technology Spread Society, 1977]. Since the thus prepared ice cream mix is pasteurized uniformly, the taste of cream, the flavor of eggs and flavors caused by various components in the said mix tend to deteriorate. Accordingly, pasteurized dairy products have been used as materials for preparing low-priced products (e.g., lacto-ice, ice milk and the like). In the preparation of high-priced products (e.g., premium ice cream and the like), raw milk and raw cream are used as materials [20] Japan Dairy Industry Technology Society: Ice Cream & Sherbet, page 4, Japan Dairy Industry Technology Society, 1964, 21) J. H. Frandsen: Ice Cream & Related Product, page 142, AVI Publishing Co., 1961], and in this case, materials prepared by a treatment such as pasteurization at a temperature as low as possible have been used.

Furthermore, in a ordinary method of producing an ice cream, it has been impossible to add high-acid materials such as yogurt, fruit juice and the like to an ice cream mix, and carry out pasteurization, since curds are formed [22] J. H. Frandsen: Ice Cream & Related Product, page 205, AVI Publishing Co., 1961]. Accordingly, a method in which an ice cream mix is pasteurized, and cooled, and then the said materials are added thereto, has been employed. In this case, too, an acid-resisting stabilizer such as pectin has to be used in a large amount in order to maintain milk components stable. Thus, the ordinary method has a problem of deteriorating the flavor of products. In order to solve such a problem, a method has been employed, in which high-acid materials are added to an ice cream frozen in a freezer by means of a fruit feeder and the like. However, the obtained products are in marble-like, ununiform state. Thus, the said method also could not provide an ice cream with these materials mixed uniformly.

Besides, the size of ice crystals of an ice cream has great influence on mouthfeel and a property of meltdown in the mouth. Especially in such products with a relatively large content of water such as sherbet and the like, the size of ice crystals has greater influence on them [23] W. S. Arbuckle: Ice Cream, ed. 4, page 292, 1986, 24) W. S. Arbuckle: Ice Cream, ed. 4, page 296, 1986]. Heretofore, the size of ice crystals of an ice cream has been controlled by adjusting a content of solids, kinds of sugar and amounts of sugar contained in an ice cream mix, types of freezers, freezing time and the like. Even with a combination of the said factors, however, the size of ice crystals could not be controlled freely.

On the other hand, though a continuous freezer having two linked cylinders has been well-known [25] W. S. Arbuckle: Ice Cream, ed. 4, page 243, 1986, 26) J. H. Frandsen: Ice Cream & Related Product, page 159, AVI Publishing Co., 1961], an apparatus in which a pipeline for supplying an ice cream mix is linked to a pipeline linking a first cylinder and a second cylinder of the cylinders of two linked continuous freezers has not been known and there has been no description about it in any document.

SUMMARY OF THE INVENTION

With the situation regarding such prior arts as the background, the present inventors have investigated about new ice cream products and processes for producing the same. By now, the present inventors have developed an ice cream having a property of excellent meltdown in the mouth and a process for producing it, and have already filed a patent application (Japanese Patent Application No. 4-31397, corresponding to claims 1 and 2 of the present invention. Hereinafter, described as the prior application (1) on occasion.).

The method of the prior application (1) relates to a process for producing an ice cream having a property of excellent meltdown in the mouth, which comprises incorporating air into an ice cream mix, which contains 5 to 18% by weight of fat, in a first cylinder of a freezer at a temperature of −3.0° to −6.0° C. to give an overrun of 20% by weight or less, then incorporating air into the said mix in a second cylinder of a freezer at a temperature of −3.0° to −8.0° C. to give an overrun of 10 to 150% by weight.

Thereafter, the present inventors have made researches eagerly with the aim of developing a process for producing an ice cream having a property of excellent softness even at a freezing temperature, regardless of a content of fat of the ice cream. Consequently, the present inventors have found that an ice cream having a property of excellent softness even at a freezing temperature can be produced by separating ice crystals which is formed, gathered and blocked at once in a freezing process of the ice cream by appending a process of mixing and kneading in case of freezing an ice cream mix in a freezer, making the said crystals grow stably and redispersing them into the unfrozen ice cream mix. As a result, the present inventors have accomplished the present invention of a process for producing an ice cream having a property of excellent softness even at a freezing temperature.

And the present inventors have filed a patent application of a process for producing an ice cream having a property of excellent softness even at a freezing temperature, which comprises incorporating air into an ice cream mix in a first cylinder of the cylinders of two linked continuous freezers to give an overrun, transferring said mix to a second cylinder at a specific temperature, and then mixing and kneading the said mix in the second cylinder without giving any additional overrun. (Japanese Patent Application No.4-109155, corresponding to claims 3 to 5 of the present invention. Hereinafter, described as the prior application (2) on occasion.)

Further, the present inventors have made researches eagerly in order to improve the above-mentioned problems of prior arts. As a result, the present inventors have found that the said problems of the prior arts can be solved by making improvements on the methods of prior arts, using the methods of prior applications (1) and (2) as a basis, and accomplished the present invention of a process and an apparatus for producing an ice cream, characterized by supplying a part of an ice cream mix additionally. That is, the present invention can solve the problems of the above-mentioned prior arts at once, by using an apparatus in which a pipeline for supplying a part of an ice cream mix to a pipeline linking a first cylinder and a second cylinder of the cylinders disclosed in the prior applications (1) and (2), and supplying the rest of the ice cream mix to the ice cream mix frozen in the first cylinder, and then refreezing the resultant mixture in the second cylinder.

That is, an object of the present invention is to provide an ice cream having thickness due to fat and a property of excellent meltdown in the mouth, and a process for producing the same, by solving the above-mentioned problems of prior arts, and reconciling the said contradictory properties of ice creams.

Further, an object of the present invention is to provide a process for producing an ice cream which has a property of excellent softness even at a freezing temperature and is capable of being spooned up easily by a spoon, an ice cream disher and the like even immediately after being taken out of a freezer.

Furthermore, an object of the present invention is to provide a process for producing an ice cream which has a property of excellent softness even at a freezing temperature and has excellent flavor, without the excessive addition of an antifreezing agents such as sugar, salt, alcohol and the like to an ice cream mix.

Besides, an object of the present invention is to provide a process for producing an ice cream having a property of excellent softness even at a freezing temperature conveniently, only by adjusting operating conditions of a freezer utilizing an ordinary freezing apparatus.

Moreover, an object of the present invention is to provide a process and an apparatus for producing an ice cream having good flavor, which can mix high-acid components in an ice cream mix uniformly and control the size of ice crystals freely.

In addition, an object of the present invention is to provide a process for producing an ice cream having good flavor, which can mix high-acid components in an ice cream mix uniformly and control the size of ice crystals freely, without the excessive addition of components such as sugar, salt, alcohol, an acid-resisting stabilizer and the like to an ice cream mix.

And, an object of the present invention is to provide a process and an apparatus for producing an ice cream having good flavor conveniently, which can mix high-acid components in an ice cream mix uniformly and control the size of ice crystals freely, by making some improvements on an ordinary freezing apparatus.

Still further, an object of the present invention is to provide a new type of apparatus for producing an ice cream, which can supply the rest of an ice cream mix additionally to a pipeline linking a first cylinder and a second cylinder of the cylinders of two linked continuous freezers.

As mentioned above, as the result of their assiduous researches, the present inventors have found the above-mentioned various information, and the fact that the formation of aggregates due to the churning of fat in the tissue of an ice cream is greatly influenced by the existence of minute air cells with a specific size or smaller one contained in the ice cream, and the fact that a property of excellent meltdown in the mouth of the said ice cream is greatly influenced by a rate of formation of ice crystals, and then accomplished the present invention.

The constitutions of the inventions 1–2 of the present invention for accomplishing the above-described objects comprise the following technical means (1)–(2):

(1) An ice cream having a property of excellent meltdown in the mouth, a fat content of 5 to 18% by weight and an overrun of 10 to 150% by weight, containing air cells of 60 $\mu$m or more in diameter at a ratio of at least 80% of the total air cells.

(2) A process for producing an ice cream having a property of excellent meltdown in the mouth, which comprises incorporating air into an ice cream mix, which contains 5 to 18% by weight of fat, in a first cylinder of a freezer at a temperature of $-3.0°$ to $-6.0°$ C. to give an overrun of 10 to 20% by weight or less, then incorporating air into the said mix in a second cylinder of a freezer at a temperature of $-3.0°$ to $-8.0°$ C. to give an overrun of 10 to 150% by weight.

Besides, the constitutions of the inventions 3–5 of the present invention for accomplishing the above-described objects comprise the following technical means (3)–(5):

(3) A process for producing an ice cream having a property of excellent softness even at a freezing temperature, which comprises incorporating air into an ice cream mix in a first cylinder of the cylinders of two linked continuous freezers to give an overrun, transferring the said mix to a second cylinder at a specific temperature, and then mixing and kneading the said mix in the second cylinder without giving any additional overrun.

(4) The process for producing an ice cream having a property of excellent softness even at a freezing temperature according to the said (3), which comprises incorporating air into an ice cream mix in a first cylinder of the cylinders of two linked continuous freezers to give an overrun of 150% by weight or less, transferring said mix to a second cylinder at a temperature of −4° to −8° C., and then mixing and kneading the said mix in the second cylinder without giving any additional overrun.

(5) The process for producing the ice cream according to the said (3), wherein the mixing and kneading is carried out at a temperature within the range from the temperature lower by 0.5° C. to the temperature higher by 0.5° C. than the drawing temperature of the first cylinder.

Thus, the process for producing an ice cream having a property of excellent softness even at a freezing temperature of the present invention is characterized by incorporating air into an ice cream mix in a first cylinder of the cylinders of two linked continuous freezers to give an overrun, transferring the said mix to a second cylinder at a specific temperature, and then mixing and kneading the said mix in the second cylinder without giving any additional overrun, and its preferrable aspect is as follows: a process which comprises incorporating air into an ice cream mix in the first cylinder of the cylinders of two linked continuous freezers to give an overrun of 150% by weight or less, transferring the said mix to the second cylinder at a temperature of −4° to −8° C., and then mixing and kneading the said mix in the second cylinder without giving any additional overrun, wherein the mixing and kneading is carried out at a temperature within the range from the temperature lower by 0.5 ° C. to the temperature higher by 0.5° C. than the drawing temperature in the first cylinder.

Further, the constitutions of the inventions 6-8 of the present invention for accomplishing the above-described objects comprise the following technical means (6)–(8):

(6) The process for producing an ice cream, which comprises freezing a part of an ice cream mix in a first cylinder of the cylinders of two linked continuous freezers, transferring the frozen ice cream mix to a second cylinder, supplying the rest of the ice cream mix to a pipeline between the first cylinder and the second cylinder, and then refreezing the ice cream mix in the second cylinder.

(7) An apparatus for producing an ice cream having a property of excellent meltdown in the mouth or excellent softness comprising:
  a) a pipeline 24 of which one end is linked to an apparatus 22 for supplying an ice cream mix;
  b) a pipeline 12 linking a first cylinder 4 and a second cylinder 13 of the cylinders of two linked continuous freezers; and
  c) the pipeline 24 of which another end is linked to the pipeline 12.

(8) The apparatus for producing an ice cream according to the said (7), wherein a positive displacement pump 11 is set on the apparatus for supplying the rest of the ice cream mix.

SUMMARY OF THE INVENTION

The present invention relates to an ice cream having a property of excellent meltdown in the mouth and a process for producing the same, and particularly the said ice cream having a property of excellent meltdown in the mouth containing air cells with a relatively large diameter uniformly is characterized by having a fat content of 5 to 18% by weight and an overrun of 10 to 150% by weight, containing air cells of 60 μm or more in diameter at a ratio of at least 80% of the total air cells, and the said process for producing an ice cream having a property of excellent meltdown in the mouth is characterized by comprising incorporating air into an ice cream mix, which contains 5 to 18% by weight of fat, in a first cylinder of a freezer at a temperature of −3.0° to −6.0° C. to give an overrun of 10 to 20% by weight or less, then incorporating air into the said mix in a second cylinder of a freezer at a temperature of −3.0° to −8.0° C. to give an overrun of 10 to 150% by weight.

Further, the present invention relates to processes for producing an ice cream having a property of excellent softness even at a freezing temperature, which is characterized by incorporating air into an ice cream mix in a first cylinder of the cylinders of two linked continuous freezers to give an overrun, transferring the said mix to a second cylinder at a specific temperature, and then mixing and kneading the said mix in the second cylinder without giving any additional overrun, and its preferred aspect is as follows: the said process comprises incorporating air into an ice cream mix in a first cylinder of the cylinders of two linked continuous freezers to give an overrun of 150% by weight or less, transferring the said mix to the second cylinder at a temperature of −4° to −8° C., and then mixing and kneading the said mix in the second cylinder without giving any additional overrun, and the said mixing and kneading is carried out at a temperature within the range from the temperature lower by 0.5° C. to the temperature higher by 0.5° C. than the drawing temperature in the first cylinder.

Furthermore, the present invention relates to a process and apparatus for producing an ice cream characterized by supplying a part of an ice cream mix additionally, and particularly, a process for producing an ice cream, which comprises freezing a part of an ice cream mix in a first cylinder of the cylinders of two linked continuous freezers, drawing the frozen ice cream mix from the first cylinder, supplying the rest of the ice cream mix to a pipeline linking the first cylinder and the second cylinder, and then refreezing the ice cream mix in the second cylinder, and apparatus for producing an ice cream, characterized by having a pipeline linking an apparatus for supplying the rest of an ice cream mix to a pipeline linking the first cylinder and the second cylinder of the cylinders of two linked continuous freezers.

The present invention provides a process for producing an ice cream with thickness due to fat, a property of excellent meltdown in the mouth, and a specific high quality.

Besides, the present invention provides a process for producing an ice cream which has a property of excellent softness even at a freezing temperature and has excellent flavor, without adding antifreezing agents such as sugar, salt, alcohol and the like to an ice cream mix.

In addition, the present invention provides a process and an apparatus for producing an ice creams, which can control the size of ice crystals and the hardness of an ice cream, and mix high-acid components in an ice cream mix uniformly without using an acid-resisting stabilizer with strong stickiness.

Other concrete aspects of the present invention are disclosed in the following detailed description.

THE FIGURES

DETAILED DESCRIPTION OF THE INVENTION

Figure 1:
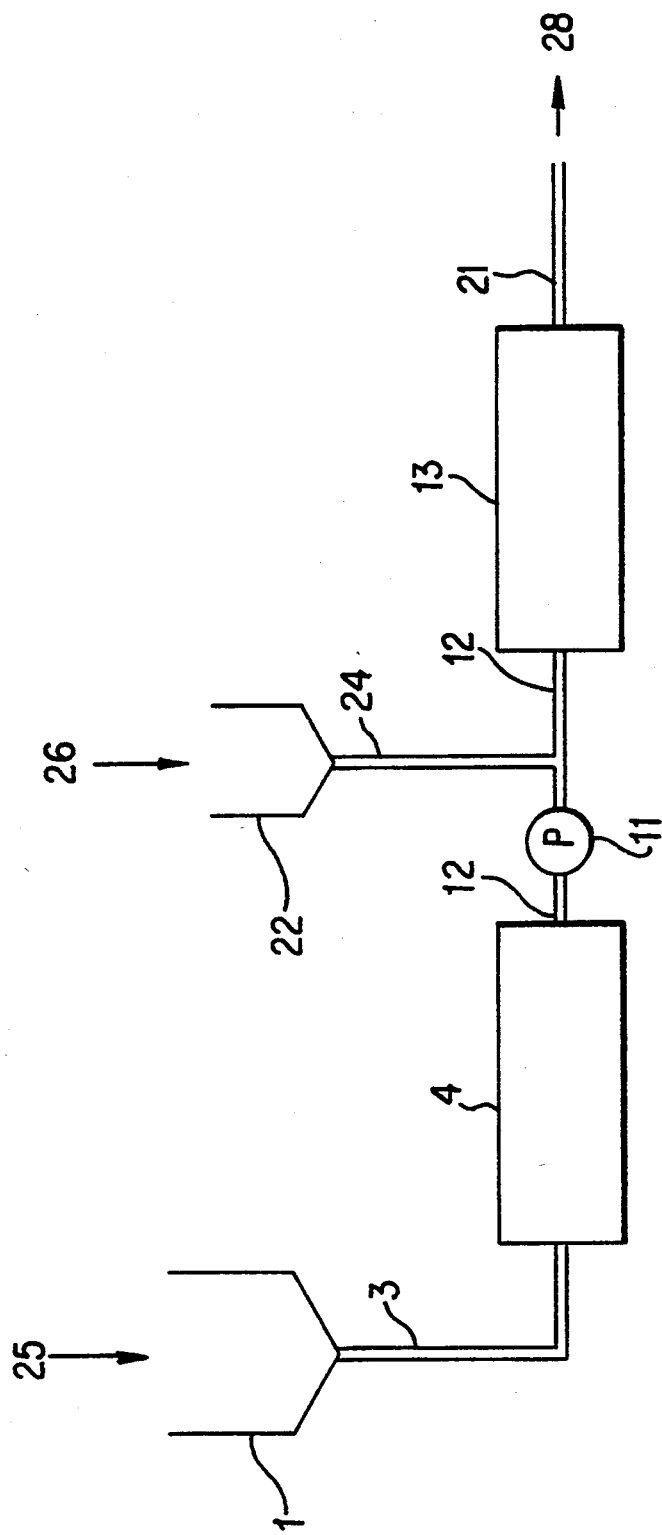
FIG. 1 is a schematic view showing an embodiment of an apparatus to be used in the process for producing an ice cream according to the present invention.

Next, the present invention will be described in detail.

The materials for an ice cream having a property of excellent meltdown in the mouth of the present invention can be produced according to the same method as an ordinary one. That is, they are produced by dissolving 5 to 18% of milk fat such as cream, butter, butter oil and the like, vegetable fat and oil to be usually used for production of an ice cream (e.g., coconut oil, palm oil and the like) or a mixture thereof, 3 to 12% of non-fat milk solids such as skim milk, skim milk powder and the like, 8 to 20% of sugar such as sugar, high fructose corn syrup and the like, if necessary, a small amount of a stabilizer, an emulsifier, a color and flavors into a specific amount of water, or mixing them uniformly, homogenizing the resultant mixture, and pasteurizing it. The prepared ice cream mix is cooled to 0° to 4° C. and aged for several hours to a whole day and night, and then frozen.

As a freezer to be used for an apparatus for producing an ice cream having a property of excellent meltdown in the mouth of the present invention, a commercially available one to be ordinarily used for producing an ice cream, can be used. An ordinary freezer on the market has 1 to 3 cylinders. In case of a freezer with one cylinder, two freezers are linked for use. In case of a freezer with two or more cylinders, the outlet of one cylinder are linked to the inlet of another cylinder for use. Since each cylinder of a freezer operates independently, the adjustment of an overrun in each cylinder is made automatically or by manual operation. It is preferable to use a freezer which can control an overrun automatically by detecting the internal pressure of a cylinder.

The process for producing an ice cream having a property of excellent meltdown in the mouth of the present invention comprises incorporating air into an ice cream mix in a first cylinder of a freezer at a temperature of $-3.0°$ to $-6.0°$ C. (preferably $-4.5°$ to $-6.0°$ C.) to give an overrun of 20% by weight or less (preferably 0 to 10% by weight), then incorporating air into the said mix in a second cylinder of a freezer at a temperature of $-3.0°$ to $-8.0°$ C. (preferably $-5.0°$ to $-8.0°$ C.) to give an overrun of 150% by weight or less (preferably 20 to 120% by weight). According to this 2-step freezing method, an ice cream containing air cells of 60 μm or more in diameter at a ratio of at least 80%, preferably at least 90%, of the total air cells is obtained. Since the obtained an ice cream contains no minute air cells, the occurrence of aggregates of fat is limited, and an ice cream having a property of excellent meltdown in the mouth can be obtained.

After the completion of the freezing process, a specific amount of an ice cream is filled into a container such as a cup and hardened in the same manner as in the production of an ordinary ice cream to obtain a final product.

Next, in the process for producing an ice cream having a property of excellent softness even at a freezing temperature of the present invention, processes except a freezing process, that is, processes of the preparation of an ice cream mix, pasteurization, ageing before a freezing process, filling into a container and hardening after a freezing process, can be carried out according to an ordinary method.

A freezing process comprises generally supplying an ice cream mix to a freezer, freezing the moisture of it rapidly, incorporating appropriate amount of air into the ice cream mix to give an overrun simultaneously, and then dispersing ice crystals, fat particles, air cells and the like occurred by partial freezing into the ice cream mix uniformly, and adjusting the texture of it. It is an important process having influence on the quality of an ice cream.

The freezing process of the present invention can be carried out by means of two continuous freezers in which two cylinders are linked, or an apparatus having the same kind of working. An ice cream product of the present invention cannot be produced by using a freezer with only one cylinder, as shown in test examples to be described later. As a continuous freezer, a commercially available one which can detect the internal pressure of a cylinder and operates automatically is used preferably. In this process of freezing, an ice cream mix is supplied to a freezer at about 5° C. and an overrun is adjusted to a specific value of 150% or less, that is, the value in the range of 0 to 150%, by incorporating air into the said mix under freezing in a first cylinder.

During this process, the temperature of the ice cream mix lowers gradually. In the process of the present invention, an ice cream mix is drawn from the first cylinder at a temperature in the range of $-4$ to $-8°$ and transferred into a second cylinder. As is apparent from test examples to be described later, when an ice cream mix is drawn at a temperature higher than $-4°$ C., mixing and kneading in a second cylinder cannot carried out effectively owing to little formation of ice in the first cylinder, and the ice cream having a property of hardness is obtained, and thus it is undesirable. And at a temperature lower than $-8°$ C., it is difficult to draw an ice cream mix from a cylinder using an ordinary freezer.

An overrun in the first cylinder is determined appropriately according to the kind of a product to be produced. Generally, when an overrun exceeds 150%, the mouthfeel of an ice cream is lost, and thus it is undesirable. It is necessary to adjust an overrun to 150% or less.

In the second cylinder, it is an important factor in the process of the present invention not to incorporate air into an ice cream mix, and to mix and knead without giving any overrun. In the second cylinder, the ice cream mix given the above overrun is mixed and kneaded at a remarkably narrow range of a temperature from 0.5° C. lower to 0.5° C. higher than the drawing temperature from the first cylinder. According to this process of mixing and kneading in the second cylinder, it becomes possible to separate blocked ice crystals in the ice cream mix, and make them grow stably, and redisperse them in the unfrozen ice cream mix.

When the range of a freezing temperature in the second cylinder is lower by more than 0.5° C. than the drawing temperature from the first cylinder and higher by more than 0.5° C., formed ice crystals are refrozen or dissolved, and accordingly an effective dispersion and stable growth of ice are inhibited. Because of this, mixing and kneading cannot carried out effectively and ice cream having a property of hardness is obtained, and thus it is undesirable.

Thus, the ice cream produced according to the process of the present invention has a property of excellent softness even at a freezing temperature and can be spooned up from the container easily by a spoon, an ice cream disher and the like even immediately after being taken out of a showcase at a shop or a household freezer. In addition, since the ice cream does not contain such components as sugar, salt, alcohol and the like excessively as compared with ordinary products, a final product with a good flavor can be obtained, without spoiling flavor and sweetness.

Next, in the process for producing an ice cream of the present invention characterized by supplying a part of an ice cream mix additionally, each process, that is, the process of preparation, pasteurization and ageing of an ice cream mix to be frozen in a first cylinder (hereinafter, referred to as a part of an ice cream mix on occasion) can be carried out according to an ordinary method except that the ice cream mix is prepared by using the rest components separated from a portion of an ice cream mix to be added after being frozen in the first cylinder (hereinafter, referred to as the rest of an ice cream mix on occasion).

The rest of an ice cream mix, for example, a high-acid material, a material which is not preferable to be heated, a material with a special flavor and the like are prepared separately from a part of an ice cream mix, and stored as follows. With respect to a high-acid material (yogurt, fruit juice and the like), a specific amount of it calculated according to the quantity of production of an ice cream is, if necessary, pasteurized, cooled and stored in a storage tank separately from the part of an ice cream mix. And, with respect to a material which is not preferable to be heated, a specific amount of it calculated according to the quantity of production of an ice cream is filtered by a germ-removing filter, pasteurized at a low temperature and also stored in a storage tank separately from the part of an ice cream mix. In addition, with respect to a material with a special flavor, a specific amount of it calculated according to the quantity of production of an ice cream is, if necessary, pasteurized, cooled and also stored in a storage tank separately from the part of an ice cream mix.

In the production of an ice cream in which the size of ice crystals is not particularly adjusted, the prepared part of an ice cream mix is supplied into a first cylinder, frozen according to an ordinary method and drawn from the first cylinder. Then, before being transferred into a second cylinder, it is mixed together with a specific amount of the rest of an ice cream mix which is supplied by means of a positive displacement pump and the like, and transferred into the second cylinder, and then refrozen. The amount of an ice cream mix drawn from the first cylinder is measured automatically, and the amount of the rest of an ice cream mix calculated from the amount of the said mix is supplied to a pipeline between the first cylinder and the second cylinder by means of a positive displacement pump and the like. It is preferable to cool the rest of an ice cream mix at almost the same temperature as that of a part of an ice cream mix drawn from the first cylinder.

The ice cream mix refrozen in the second cylinder can be filled in a container and hardened according to an ordinary method.

The production of the ice cream which has preferable size of ice crystals and a property of preferable hardness can be carried out according to inventions 3–5 of the present invention as follows.

A freezing process comprises generally transferring an ice cream mix into a freezer, freezing the moisture of it rapidly, incorporating an appropriate amount of air into the ice cream mix simultaneously, to give an overrun, and then dispersing ice crystals, fat particles, air cells and the like occurred by partial freezing into the ice cream mix uniformly, and adjusting the tissue. It is an important process having influence on the quality of an ice cream.

The freezing process can be carried out by means of two continuous freezers in which two cylinders are linked or an apparatus having the same kind of working. An ice cream product of the present invention cannot be produced by using a freezer with only one cylinder. As a continuous freezer, a commercially available one which can detect the internal pressure of a cylinder and operates automatically is used preferably. In this process of freezing, an ice cream mix is supplied into a freezer at about 5° C. and an overrun is adjusted to a value of 150% or less, that is, the value in the range of 0 to 150%, by incorporating air into the ice cream mix under cooling in a first cylinder.

During this process, the temperature of the ice cream mix lowers gradually. In the process of inventions 3–5 of the present invention, an ice cream mix is drawn from the first cylinder at a temperature of the range of −4° to −8° C. and transferred into a second cylinder. When an ice cream mix is drawn at a temperature higher than −4° C., refreezing in the second cylinder cannot be carried out effectively owing to little formation of ice crystals in the first cylinder, and the ice cream having a property of hardness is obtained, and thus it is undesirable. And at a temperature lower than −8° C., it is difficult to draw an ice cream mix from a cylynder using an ordinary freezer.

An overrun in a first cylinder is determined appropriately according to the kind of a product to be produced. Generally, when an overrun exceeds 150%, good mouthfeel of an ice cream is lost, and thus it is undesirable. It is necessary to adjust an overrun to 150% or less. To the part of an ice cream mix drawn from the first cylinder is transferred to the rest of the ice cream mix in the same manner as above, and then the resultant mix is transferred into a second cylinder. It is preferable to cool the rest of the ice cream mix at almost the same temperature as that of the part of the ice cream mix drawn from the first cylinder.

In a second cylinder, it is an important factor in the process of inventions 3–5 of the present invention not to incorporating air into an ice cream mix, and to refreeze without giving any overrun. In the second cylinder, the ice cream mix given the above overrun is refrozen at a remarkably narrow range of a temperature from 0.5° C. lower to 0.5° C. higher than the drawing temperature from a first cylinder. According to this process of refreezing in the second cylinder, it becomes possible to separate blocked ice crystals in the ice cream mix, make them grow stably and redisperse them in the unfrozen ice cream mix.

When the range of a freezing temperature in the second cylinder is lower by more than 0.5° C. than the drawing temperature in the first cylinder, and higher by more than 0.5° C., formed ice crystals are refrozen or dissolved, and accordingly an effective dispersion and stable growth of ice are inhibited. Because of this, freezing cannot be carried out effectively, and the ice cream having a property of hardness is obtained, and thus it is undesirable.

The ice cream mix refrozen in the second cylinder can be filled in a container and hardened according to an ordinary method.

In addition, an ice cream can be produced without strictly controlling the drawing temperature from a freezer as in inventions 3-5 of the present invention, by freezing a part of the ice cream mix in the first cylinder in the same manner as an ordinary method, mixing the rest of the ice cream mix, and giving an overrun in the second cylinder in the same manner as an ordinary method.

The thus produced ice cream has a property of excellent softness even at a freezing temperature and can be spooned up from the container easily by a spoon, an ice cream disher and the like even immediately after being taken out of a showcase at a shop or a household freezer. In addition, since the ice cream does not contain such components as sugar, salt, alcohol and the like excessively as compared with ordinary products, a final product with a good flavor can be obtained, without spoiling flavor and sweetness of it. In addition, it is possible to mix high-acid components uniformly without adding an extra component such as an acid-resisting stabilizer, and obtain a final product in which the size of ice crystals is controlled freely.

Next, the apparatus for producing an ice cream of the present invention is described. As shown in FIG. 1, the apparatus comprises a pipeline 24 of which one end is linked to an apparatus 22 for supplying an ice cream mix, a pipeline 12 linking a first cylinder 4 and a second cylinder 13 of the cylinders of two linked continuous freezers, and the pipeline 24 of which another end is linked to the pipeline 12. A continuous freezer with two linked cylinders may be a commercially available one such as KMLT318 manufactured by Crepaco Co.. The pipeline 24 for supplying the rest of an ice cream mix is linked to the pipeline 12 which is linked to the first cylinder 4 and the second cylinder 13 of such a continuous freezer, and from a storage tank for storing the rest of an ice cream mix is supplied a specific amount of the rest of an ice cream mix caluculated from the amount of the part of an ice cream mix drawn from the first cylinder by means of, for example, a positive displacement pump 11.

The size of a diameter of a pipe of the pipeline 12 is optional, and to the said pipeline is usually applied an heat insulating treatment. It is preferable that the amount of the part of an ice cream mix drawn from the first cylinder, the timing of said drawing, the amount of the rest of an ice cream mix to be supplied, and the timing of said supplying, are controlled automatically.

EXPERIMENTAL

Next, the present invention will be described in detail in the following Test Examples. (Test Examples 1-5: tests for producing an ice cream having a property of excellent meltdown in the mouth)

TEST EXAMPLE 1

This test was carried out in order to examine the influences of a fat content and sizes of air cells on a property of meltdown in the mouth of an ice cream.

(1) Preparation of Samples 6 kinds of test samples were prepared according to the same method as in Example 1 except that the contents of milk fat were adjusted to 3, 5, 8, 15, 18 and 20%, using unsalted butter (manufactured by Morinaga Milk Industry Co., Ltd.). Besides, 6 kinds of control samples were prepared according to the same method as in Comparative Example except that the contents of milk fat were adjusted to 3, 5, 8, 15, 18 and 20%, using unsalted butter (manufactured by Morinaga Milk Industry Co., Ltd.).

(2) Method of the Test

1) Measurement of diameters of air cells

The diameters of air cells of each sample were measured regarding 3 optional fields of vision at 20-200 x magnification at $-3°$ C. by means of a stereomicroscope (S2H, manufactured by Olympus Co., Ltd.), by applying each sample on a slide glass at $-15°$ C. and raising the temperature of the said sample gradually, and photographs of them were taken.

2) Sensory test

With respect to test samples and control samples having each fat content, a property of meltdown in the mouth and creaminess of the said samples were sensorially tested respectively, according to the method of paired comparisons by Sheffé (edited by Japan Scientific Technology Federation Sensory Examination Committee: Sensory Examination Handbook, Japan Scientific Technology Federation, 1962), by a panel comprising 15 men and 15 women. The results were analyzed statistically and a significant difference of the results was examined.

(3) Results of the Test

The results of the said test are as shown in Table 1. As is apparent from Table 1, it was found that, in control samples, an average diameter of air cells of each samples with every fat content was half or less than that of a test sample, and that many minute air cells existed. To the contrary, it was found that there existed air cells with a large average diameter in test samples, and that, especially in test samples with 5 to 18% of a fat content, the proportion of air cells with diameters of 60 $\mu$m or less in the total air cells was only 10% or less.

Figure 2A:
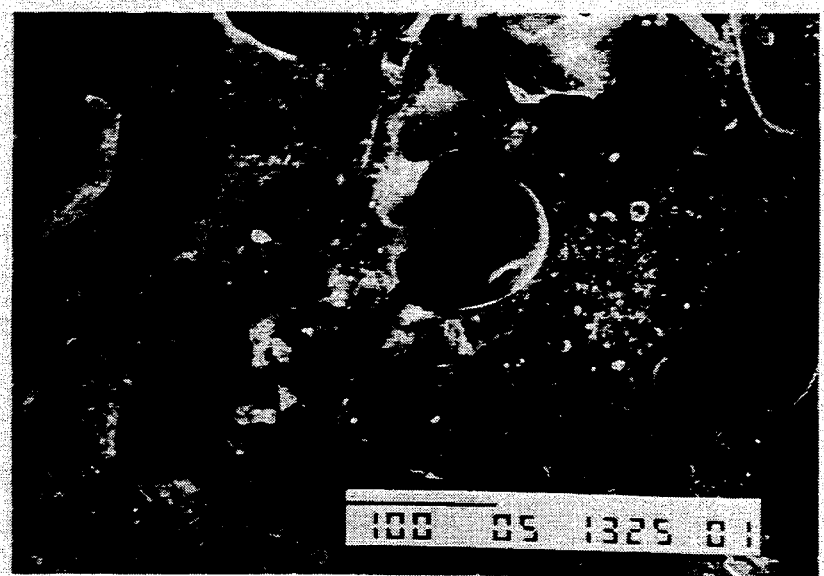
FIGS. 2a and 2b are explanatory drawings (photomicrographs) showing the states of air cells of an ice cream having a property of excellent meltdown in the mouth of the present invention and those of a conventional one.
Figure 2B:
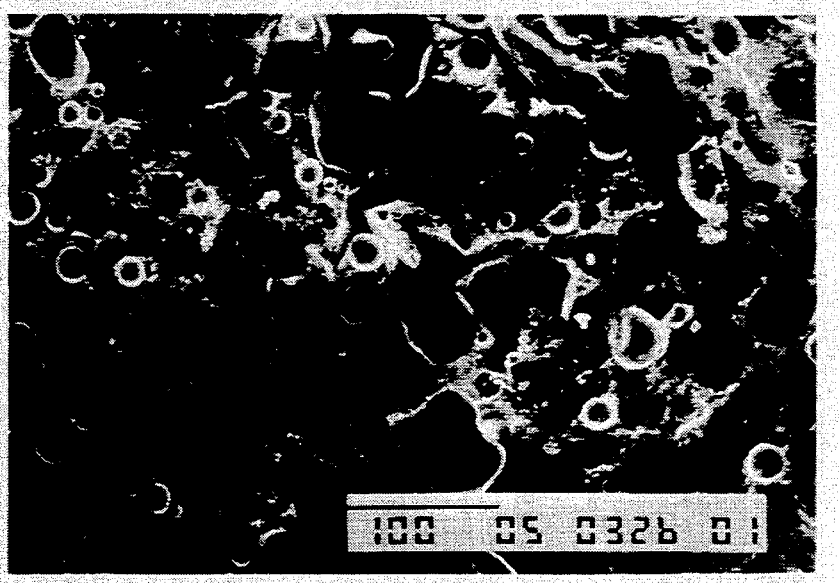

FIGS. 2a and 2b show photomicrographs of the states of air cells in test samples and control samples. The alphabet of a and b in FIG. 2 show a test sample (ice cream having a property of excellent meltdown in the mouth of the present invention) and a control sample respectively. The length of a line in the lower white part of FIGS. 2a and 2b show 100 $\mu$m. Those that look like black hollows on the photographs are air cells. In spite of being photographed with the conditions of the same overrun (the same amount of air) and the same magnification, a lot of small air cells exist in the control sample of b, while in the test sample there exist only a small amount of large air cells. Accordingly, FIGS. 2a and 2b show the difference of the size and number of air cells existing in both samples clearly.

Consequently, it becomes clear that in test samples with 5 to 18% of a fat content, a property of meltdown in the mouth is excellent significantly, compared with control samples, as shown in the results of the sensory test.

Besides, when a test was carried out by altering a condition and a blending proportion of materials in the said test, almost the same results were obtained.

TABLE 1

| Fat content (%) | Diameter of control air cells (Average) (μm) | Diameter of air cells of samples | | Sensory test | |
|---|---|---|---|---|---|
| | | Average (μm) | Below 60 μm (%) | Property of meltdown in the mouth | Creaminess |
| 3 | 45 | 93 | 5 | ** | ** |
| 5 | 43 | 91 | 7 | 5%* | ** |
| 8 | 36 | 93 | 9 | 1%* | ** |
| 15 | 34 | 88 | 9 | 1%* | ** |
| 18 | 29 | 80 | 10 | 5%* | ** |
| 20 | 28 | 82 | 14 | ** | ** |

(Note)
"Below 60 μm (%)" means a percentage of minute air cells with a diameter of 60 μm or less to the total air cells.
*significant different at the 1% or 5% level.
**No significant difference

TEST EXAMPLE 2

This test was carried out in order to examine the influence of overruns on sizes of air cells and a property of meltdown in the mouth of an ice cream.

(1) Preparation of Samples 8 kinds of test samples were prepared according to the same method as in Example 1 except that overruns were adjusted to 5, 10, 20, 50, 80, 120, 150 and 180%. Besides, 8 kinds of control samples were prepared according to the same method as in Comparative Example except that overruns were adjusted to 5, 10, 20, 50, 80, 120, 150 and 180%.

(2) Method of the Test

The test was carried out according to the same method as in Test Example 1.

(3) Results of the Test

The results of the said test are as shown in Table 2. As is apparent from Table 2, it was found that, in control samples, an average diameter of air cells of each samples with every overrun was half or less than that of a test sample, and that many minute air cells existed. To the contrary, it was found that there existed air cells with a large average diameter in test samples, and that, especially in test samples with 10 to 150% of an overrun, the proportion of air cells with diameters of 60μm or less to the total air cells was only about 10%.

Consequently, it becomes clear that in test samples with 10 to 150% of an overrun, a property of meltdown in the mouth is excellent significantly, compared with control samples, as shown in the results of the sensory test.

Besides, when a test was carried out by altering a condition and a blending proportion of materials in the said test, almost the same results were obtained.

TABLE 2

| Overrun (%) | Diameter of control air cells (Average) (μm) | Diameter of air cells of samples | | Sensory test | |
|---|---|---|---|---|---|
| | | Average (μm) | Below 60 μm (%) | Property of meltdown in the mouth | Creaminess |
| 5(0) | 41 | 84 | 12 | ** | ** |
| 10(0) | 38 | 93 | 11 | 5%* | ** |
| 20(5) | 40 | 103 | 9 | 1%* | ** |
| 50(10) | 34 | 112 | 11 | 1%* | ** |
| 80(10) | 32 | 105 | 12 | 1%* | ** |
| 120(10) | 36 | 93 | 9 | 1%* | ** |
| 150(10) | 33 | 84 | 12 | 5%* | ** |
| 170(10) | 32 | 81 | 16 | ** | ** |

(Note)
1) "Below 60 μm (%)" means a percentage of minute air cells with a diameter of 60 μm or less to the total air cells.
2) The values of overruns in parentheses show those of the overruns in a first cylinder.
*significant different at the 1% or 5% level.
**No significant difference

TEST EXAMPLE 3

This test was carried out in order to examine the influence of overruns in a first cylinder on sizes of air cells and a property of meltdown in the mouth of an ice cream.

(1) Preparation of Samples 4 kinds of samples were prepared according to the same method as in Example 1 except that overruns in the first cylinder were adjusted to 0, 10, 20 and 30%.

(2) Method of the Test

The test was carried out according to the same method as in Test Example 1.

(3) Results of the Test

The results of the said test are as shown in Table 3. As apparent from Table 3, it was found that, in samples with an overrun of more than 20% in the first cylinder, an average diameter of air cells became remarkably small, the proportion of air cells with diameters of 60 μm or less to the total air cells became more than about three times that in samples with an overrun of 20% or less in the first cylinder and that many minute air cells existed.

Consequently, it becomes clear that in test samples with an overrun of 20% or less in the first cylinder, a property of meltdown in the mouth is excellent significantly, compared with samples with an overrun of more than 20% in the first cylinder.

Besides, when a test was carried out by altering a condition and a blending proportion of materials in the said test, almost the same results were obtained.

TABLE 3

| Overrun (%) | Diameter of air cells of samples | | Sensory test | |
|---|---|---|---|---|
| | Average (μm) | Below 60 μm (%) | Property of meltdown in the mouth | Creaminess |
| 0 | 108 | 6 | 1%* | ** |
| 10 | 93 | 9 | 1%* | ** |
| 20 | 83 | 11 | 5%* | ** |
| 30 | 62 | 32 | ** | ** |

(Note)
"Below 60 μm (%)" means a percentage of minute air cells with a diameter of 60 μm or less to the total air cells.
*significant different at the 1% or 5% level.
**No significant difference

TEST EXAMPLE 4

This test was carried out in order to examine the influence of temperatures in a first cylinder on sizes of air cells and a property of meltdown in the mouth of an ice cream.

(1) Preparation of Samples 5 kinds of samples were prepared according to the same method as in Example 1 except that temperatures in the first cylinder were adjusted to $-1°$, $-3°$, $-5$, $-6$ and $-6.5°$ C.

(2) Method of the Test

The test was carried out according to the same method as in Test Example 1.

(3) Results of the Test

The results of the said test are as shown in Table 4. As apparent from Table 4, it was found that when a temperature in the first cylinder was higher than $-3°$ C., an average diameter of air cells became remarkably small, the proportion of air cells with diameters of 60 μm or less to the total air cells became more than about three times that in samples at a temperature of $-3°$ to $-6°$ C. in the first cylinder, and that many minute air cells existed. On the other hand, when a temperature in the first cylinder was lower than $-6°$ C., there was no difference in the state of air cells, compared with samples at a temperature of $-3°$ to $-6°$ C. in the first cylinder. As shown in the result of the sensory test, however, there was no significant difference in a property of meltdown in the mouth, and freezing of an ice cream mix occured in the cylinder, and thus it is not desirable. Accordingly, temperatures in the first cylinder need to be adjusted to $-3°$ to $-6°$ C.

Besides, when a test was carried out by altering a condition and a blending proportion of materials in the said test, almost the same results were obtained.

TABLE 4

| Temperature in a 1st cylinder (°C.) | Diameter of air cells of samples | | Sensory test | |
|---|---|---|---|---|
| | Average (μm) | Below 60 μm (%) | Property of meltdown in the mouth | Creaminess |
| −1 | 43 | 44 | ** | ** |
| −3 | 84 | 14 | 5%* | ** |
| −5 | 93 | 9 | 1%* | ** |
| −6 | 101 | 9 | 1%* | ** |
| −6.5 | 104 | 9 | ** | ** |

(Note)
"Below 60 μm (%)" means a percentage of minute air cells with a diameter of 60 μm or less to the total air cells.
*significant different at the 1% or 5% level.
**No significant difference

TEST EXAMPLE 5

This test was carried out in order to examine the influence of temperatures in a second cylinder on sizes of air cells and a property of meltdown in the mouth of an ice cream.

(1) Preparation of Samples 4 kinds of samples were prepared according to the same method as in Example 1 except that temperatures in the second cylinder were adjusted to $-3$, $-6$, $-8$ and $-8.5°$ C.

Incidentally, heating an ice cream mix drawn at a low temperature from a cylinder is not carried out in the production of ice cream ordinarily. In this test, therefore, a temperature of $-3°$ C., the highest temperature in a first cylinder, was employed, and a cooling temperature in the second cylinder was adjusted to the same level as described above, and samples were prepared.

(2) Method of the Test

The test was carried out according to the same method as in Test Example 1.

(3) Results of the Test

The results of the said test are as shown in Table 5. As apparent from Table 5, it was found that when a temperature in the second cylinder was lower than $-8°$ C., there was no significant difference in the state of air cells compared with samples at a temperature of $-3°$ to $-8°$ C. in the second cylinder, and also that as shown in the result of the sensory test, there was no significant difference in a property of meltdown in the mouth. However, freezing of an ice cream mix occured in the cylinder, and thus it is not desirable. Accordingly, temperatures in the second cylinder need to be adjusted to $-3°$ to $-8°$ C.

Besides, when a test was carried out by altering a condition and a blending proportion of materials in the said test, almost the same results were obtained.

TABLE 5

| Temperature in a 2nd cylinder (°C.) | Diameter of air cells of samples | | Sensory test | |
|---|---|---|---|---|
| | Average (μm) | Below 60 μm (%) | Property of meltdown in the mouth | Creaminess |
| −3 | 80 | 16 | 5%* | ** |
| −6 | 91 | 11 | 1%* | ** |
| −8 | 104 | 9 | 1%* | ** |
| −8.5 | 102 | 9 | ** | ** |

(Note)
"Below 60 μm (%)" means a percentage of minute air cells with a diameter of 60 μm or less to the total air cells.
*significant different at the 1% or 5% level.
**No significant difference

COMPARATIVE EXAMPLE

About 230 kg of an ice cream was obtained according to the same method as in Example 1 except that only one cylinder of the same freezer as in Example 1 was used to adjust an overrun to 120%, and that the flow of an ice cream mix was adjusted to 300 l/hour.

(Test Examples 6-8: tests for producing an ice cream having a property of excellent softness even at a freezing temperature)

TEST EXAMPLE 6

This test was carried out in order to examine drawing temperatures in a first cylinder.

1) Preparation of Samples

Ice cream samples were prepared according to the same method as in Example 5 to be described later except that drawing temperatures in the first cylinder were adjusted to $-3.0°$, $-4.0°$, $-5.0°$ and $-8.0°$ C., and that mixing and kneading temperatures in a second cylinder were adjusted to the same temperatures as the said drawing temperatures in the first cylinder.

Furthermore, as a control ice cream, an ice cream prepared with only one cylinder at the same temperature as in a test sample was used.

2) Method of the Test

Each of the said samples was cut to a thickness of 10 mm from the upper side by means of a slicer to prepare a test sample.

Each test sample was kept at a temperature of −16°±0.2° C. for 24 hours, letting a plunger (cylindrical type, outer diameter: 17 mm, inner diameter: 16 mm) penetrate into the surface of a test sample by 5 mm by means of a tensipresser (Model TTP-57BX, manufactured by Taketomo Denki K. K.) at a rate of 120 mm/min. The degree of a hardness was measured when penetration was made by 4 mm (a degree of a hardness is indicated by gramme weight. Hereinafter described as g·w.). With respect to each sample, an average value of a hardness of a test sample was calculated according to 5 measurements.

Furthermore, illustrating an example of a hardness of another food measured by the same apparatus in order to show a property of hardness shown by a degree measured according to the said method concretely, the hardness of butter kept at 7° C. is about 3500 g.w.

(3) Results of the Test

The results of the said test are shown in Table 6. As apparent from Table 6, it was found that when compared at the same temperature, the hardness of the ice cream produced according to the process of the present invention was remarkably lower than that of the control ice cream, and that the said ice cream had a property of excellent softness even at a freezing temperature. The ice cream produced by adjusting a drawing temperature in a first cylinder to −3° C. has a property of high hardness, and thus it is not desirable. Besides, it is difficult to draw an ice cream mix at a temperature below −8.0° C. in a freezer on the market.

Thus, it was found that when a drawing temperature in the first cylinder was in the range of −4.0° to −8.0° C., the said object of the present invention was accomplished.

Furthermore, when a test was carried out about an ice cream with other blending proportion of materials, almost the same results were obtained.

TABLE 6

| Drawing Temperature in a 1st cylinder (°C.) | Hardness of the ice cream of the invention (g · w) | Hardness of the control ice cream (g · w) |
| --- | --- | --- |
| −3.0 | 5420 | 8485 |
| −4.0 | 3755 | 7354 |
| −5.0 | 3082 | 6321 |
| −8.0 | 3015 | 5940 |

TEST EXAMPLE 7

This test was carried out in order to examine an overrun in a first cylinder.

1) Preparation of Samples

Ice cream samples were prepared according to the same method as in Example 5 to be described later except that a drawing temperature in the first cylinder and a mixing and kneading temperature in a second cylinder were adjusted to −5.0° C., and that overruns in the first cylinder were adjusted as shown in Table 2.

Furthermore, as a control ice cream, an ice cream prepared with only one cylinder under the same conditions as in a test sample was used.

2) Method of the Test

A hardness of the said samples was measured according to the same method as in Test Example 6.

3) Results of the Test

The results of the said test are shown in Table 7. As apparent from Table 7, it was found that when compared under the same overrun, the hardness of the ice cream produced according to the process of the present invention was remarkably lower than that of the control ice cream, and that the said ice cream had a property of excellent softness even at a freezing temperature. When an overrun is large, a property of hardness of the ice cream produced according to the process of the present invention is similar to that of the control ice cream. However, the said control ice cream has sponge-like tissue and little marketable value.

Thus, it was found that when an overrun in the first cylinder was in the range of 0 to 150%, the said object of the present invention was accomplished. Here, an overrun of 0 to 150% means an overrun of 150% or less.

Furthermore, when a test was carried out about an ice cream with another blending proportion of materials, almost the same results were obtained.

TABLE 7

| Overrun in a 1st cylinder (°C.) | Hardness of the ice cream of the invention (g · w) | Hardness of the control ice cream (g · w) |
| --- | --- | --- |
| 0 | 3725 | 9745 |
| 30 | 3082 | 6321 |
| 100 | 2012 | 5085 |
| 150 | 1745 | 4031 |
| 170 | 1540 | 3780 |

TEST EXAMPLE 8

This test was carried out in order to examine a suitable temperature in a second cylinder.

1) Preparation of Samples

Ice cream samples were prepared according to the same method as in Example 5 to be described later except that a drawing temperature in a first cylinder was adjusted to −5.0° C., and that a mixing and kneading temperature in the second cylinder was adjusted as shown in Table 8.

2) Method of the Test

A hardness of the said samples was measured according to the same method as in Test Example 6.

3) Results of the Test

The results of the above test are as shown in Table 8. As apparent from Table 8, it was found that when an ice cream mix was mixed and kneaded without giving any overrun in the second cylinder at a temperature lower than a drawing temperature in the first cylinder by 0.5° C. or higher than the temperature by 0.5° C., a hardness of the said mix increased remarkably. To the contrary, when an ice cream mix was mixed and kneaded without giving any overrun in the second cylinder at a temperature within the range from the temperature lower by 0.5° C. to the temperature higher by 0.5° C. than the drawing temperature in the first cylinder, a hardness of the said mix not increased.

Thus, it was found that a mixing and kneading temperature in the second cylinder close to a drawing temperature in the first cylinder was preferable, and that the said object of the present invention was accomplished at a temperature in a remarkably narrow range from the temperature lower by 0.5° C. to the temperature higher by 0.5° C. than the drawing temperature in the first cylinder.

Furthermore, when a test was carried out about ice creams with another blending proportion of materials, almost the same results were obtained.

TABLE 8

| Drawing Temperature in a 1st cylinder (°C.) | Mixing & kneading temperature in a 2nd cylinder (°C.) | Hardness of the ice cream of the invention (g · w) |
|---|---|---|
| −5.0 | −4.0 | 5060 |
|  | −4.5 | 3248 |
|  | −5.0 | 3082 |
|  | −5.5 | 3105 |
|  | −6.0 | 4942 |

(Test Examples 9–12: tests for producing an ice cream prepared by supplying a part of an ice cream mix additionally)

TEST EXAMPLE 9

This test was carried out in order to examine whether or not the deterioration of flavor of an ice cream can be prevented.

1) Preparation of Samples

An ice cream produced according to the same method as in Example 9 was used as a sample (Sample 1). As control samples, a sample (Sample 2) produced according to an ordinary method using one cylinder, by preparing the whole ice cream mix of Example 9 at the same time according to an ordinary method, and a sample (Sample 3) produced according to an ordinary method using one cylinder, by mixing the ice cream mix prepared according to the same method as in Example 9 in the same tank, were used.

2) Method of the Test

By a panel composed of 15 men and 15 women, mouthfeel, creamy flavor, a property of meltdown in the mouth and aftertaste of the said samples were evaluated sensorially by 5 grades respectively. Regarding each sample, an average value of each test item was calculated and examined. In the grades of evaluation, "very bad" about mouthfeel, a property of meltdown in the mouth and aftertaste were evaluated as 1 point, "bad" as 2 points, "moderate" as 3 points, "good" as 4 points and "very good" as 5 points (hereinafter this evaluation will be described as Evaluation 1). With respect to creamy flavor, "very weak" was evaluated as 1 point, "weak" as 2 points, "moderate" as 3 points, "strong" as 4 points and "very strong" as 5 points (hereinafter this evaluation will be described as Evaluation 2).

3) Results of the Test

The results of the said test are as shown in Table 9. As apparent from Table 9, mouthfeel, creamy flavor, a property of meltdown in the mouth and aftertaste of the Sample 1 were far more excellent than those of other two samples, and especially, creamy flavor was excellent, which was due to the fact that the deterioration of the flavor of an ice cream mix at heating was controlled in Sample 1.

Furthermore, when a test was carried out with another ice cream mix, almost the same results were obtained.

TABLE 9

| Sample | Mouthfeel | Creamy flavor | Property of meltdown in the mouth | Aftertaste |
|---|---|---|---|---|
| Sample 1 | 4.2 | 4.6 | 4.4 | 3.8 |
| Sample 2 | 3.1 | 3.4 | 3.2 | 3.3 |
| Sample 3 | 3.3 | 3.8 | 3.5 | 3.4 |

TEST EXAMPLE 10

This test was carried out in order to examine whether or not a flavor-enriched product can be obtained.

1) Preparation of Samples

An ice cream produced according to the same method as in Example 10 was used as a sample (Sample 1). As a control sample, a sample (Sample 2) produced according to an ordinary method using one cylinder, by preparing the whole ice cream mix of Example 10 at the same time according to an ordinary method, was used.

2) Method of the Test

The same method as in Test Example 9 was employed except that a test item of "creamy flavor" in Test Example 9 was changed to "condensed milk flavor".

3) Results of the Test

The results of the said tests are as shown in Table 10. As apparent from Table 10, mouthfeel, condensed milk flavor, a property of meltdown in the mouth and aftertaste of Sample 1 were far more excellent than those of a control sample, and especially, condensed milk flavor was excellent. It shows that by forming ice crystals in Sample 1 in a first cylinder, and then adding condensed milk and refreezing, flavor enriching components of the said Samples are frozen in a state of thickness to some degrees, and as a result, the flavor of an ice cream is enriched.

Furthermore, when a test was carried out with another ice cream mix, almost the same results were obtained.

TABLE 10

| Sample | Mouthfeel | Condensed milk flavor | Property of meltdown in the mouth | Aftertaste |
|---|---|---|---|---|
| Sample 1 | 4.1 | 4.5 | 4.1 | 3.9 |
| Sample 2 | 3.4 | 2.9 | 2.7 | 3.1 |

TEST EXAMPLE 11

This test was carried out in order to examine whether or not a high-acid material can be added to an ice cream mix.

1) Preparation of Samples

An ice cream produced according to the same method as in Example 11 was used as a sample (Sample 1). As control samples, a sample (Sample 2) produced according to an ordinary method using one cylinder, by preparing the whole ice cream mix of Example 11 at one time according to an ordinary method, and a sample (Sample 3) produced according to an ordinary method using one cylinder, by preparing an ice cream mix according to the same method as in Example 11, except that a stabilizer was changed to acid-resisting pectin (manufactured by Saneigen FFI), were used.

2) Method of the Test

The same method as in Test Example 9 was employed except that test items of "creamy flavor" and "a property of meltdown in the mouth" in Test Example 9 were changed to "juiciness" and "stickiness", and that they were evaluated by Evaluation 2.

3) Results of the Test

The results of the said test are as shown in Table 11. As apparent from Table 11, mouthfeel, juiciness, stickiness and aftertaste of Sample 1 are far more excellent than those of each control samples. Especially in Sample 2, curds are formed by the addition of juice, and thus it has little marketable value. Sample 2 in which a stabilizer is replaced by acid-resisting pectin had a strong "stickiness" and is not desirable. It shows that it is due to the fact that a part of an ice cream mix of Sample 1 is frozen in a first cylinder, and reactivity of milk protein in the said mix to the acid decreases, and thereafter an high-acid material is added.

Furthermore, when a test was carried out with another ice cream mix, almost the same results were obtained.

TABLE 11

| Sample | Mouthfeel | Juiciness | Stickiness | Aftertaste |
|---|---|---|---|---|
| Sample 1 | 4.3 | 4.1 | 3.3 | 4.5 |
| Sample 2 | 1.4 | 2.8 | 3.5 | 1.5 |
| Sample 3 | 2.8 | 3.1 | 4.5 | 3.4 |

TEST EXAMPLE 12

This test was carried out in order to examine whether or not the state of ice crystals in an ice cream can be controlled.

1) Preparation of Samples

An ice cream produced according to the same method as in Example 12 was used as a sample (Sample 1). As a control sample, a sample (Sample 2) produced according to an ordinary method at the same temperature with a drawing temperature in a second cylinder of Sample 1 using one cylinder, by preparing the whole ice cream mix of Example 12 at one time, was used.

2) Method of the Test

Each of the said samples was cut to a thickness of 10 mm from the upper side by means of a slicer to prepare a test sample. Each test sample was kept at a temperature of $-16\pm0.2°$ C. for 24 hours, letting a plunger (cylindrical type, outer diameter: 17 mm, inner diameter: 16 mm) penetrate into the surface of a test sample by 5 mm by means of a tensipresser (Model TTP57BX, manufactured by Taketomo Denki K. K.) at a rate of 120 mm/min. The degree of a hardness was measured when penetration was made by 4 mm (a degree of a hardness is indicated by gramme weight. Hereinafter described as g·w.). With respect to each sample, an average value of a hardness of a test sample was calculated according to 5 measurements. Furthermore, illustrating as an example of a hardness of another food measured by the same apparatus in order to show a hardness shown by a degree measured according to the method concretely, the hardness of butter kept at 7° C. is about 3500 g·w.

3) Results of the Test

As a result of the test, the hardness of Sample 1 is 2938 g·w and that of Sample 2 is 4820 g·w. As apparent from this result, it was found that the ice cream produced according to the method of the present invention had a property of far lower hardness than that of the ice cream produced according to a conventional method. It shows that after a part of an ice cream mix of Sample 1 is frozen in a first cylinder to form ice crystals, the rest of the ice cream mix which consists of a thick sugar solution is added, and then, by refreezing it, the surroundings of the said ice crystals are covered with the said sugar solution, and thus an ice cream having a property of softness even at a low temperature can be obtained.

Furthermore, when a test was carried out with another ice cream mix, almost the same results were obtained.

In accordance with the subject invention, a novel and useful ice cream having a property of excellent meltdown in the mouth and a process for producing the same are provided as follows:

1) An ice cream having thickness due to fat and a property of excellent meltdown in the mouth can be provided.
2) A process for producing an ice cream having thickness due to fat, a property of excellent meltdown in the mouth and a specific high quality can be provided in a convenient way.

Further, according to the process for producing an ice cream having a property of excellent softness even at a freezing temperature of the present invention, 1) An ice cream which has a property of excellent softness even at a freezing temperature and is capable of being spooned up easily by a spoon, an ice cream disher and the like even immediately after being taken out of a freezer can be produced in a convenient way.
2) In addition, the process for production of the present invention is characterized by being capable of producing an ice cream having a property of excellent softness in the mouth even at a freezing temperature and excellent flavors, without the exessive addition of components having an antifreezing effect such as sugar, salt, alcohol and the like to an ice cream mix.
3) Besides, according to the process of the present invention, an ice cream having a property of excellent in the mouth even at a freezing temperature can be produced in a convenient way only by adjusting operating conditions of a freezer by means of conventional facilities.

Furthermore, a novel and useful process and the apparatus of the present invention for producing an ice cream, characterized by supplying a part of an ice cream mix additionally are provided as follows:

1) An ice cream having excellent flavor can be produced.
2) The size of ice crystals and the hardness of an ice cream can be freely controlled.
3) An ice cream in which high-acid components are mixed uniformly can be produced without using an acid-resisting stabilizer with strong stickiness.
4) A variety of ice creams can be produced since the flavor components of an ice cream, which is deteriorated by heating in an ordinary process, can be enriched without said deterioration.

5) An ice cream having a property of excellent meltdown in the mouth can be produced.

EXAMPLES

Next, the present invention will be further described in detail in the following Examples. However, it should be noted that the present invention is not restricted to the following Examples.

(Examples 1–4: production of an ice cream having a property of excellent meltdown in the mouth)

EXAMPLE 1

To 134.37 kg of water were added 60.0 kg of raw milk, 26.4 kg of unsalted butter (manufactured by Morinaga Milk Industry Co., Ltd.), 26.4 kg of skim milk powder (manufactured by Morinaga Milk Industry Co., Ltd.), 39.0 kg of purified sucrose (manufactured by Toyo Seito K. K.), 12.0 kg of hydrolyzed starch powder (manufactured by Showa Sangyo K. K.) and 1.5 kg of an emulsifier and stabilizer (Sunnice N, manufactured by Sanei Kagaku K. K.), and dissolved or mixed uniformly. The resultant mixture was heated to 60° C. and homogenized at 2 stages (150 kg/cm$^2$ and 50 kg/cm$^2$), pasteurized at 85° C. for 15 seconds and cooled to 5° C. To the resultant mixture were added 0.03 kg of a color (Sunyellow No. 2, manufactured by Sanei Kagaku K. K.) and 0.3 kg of vanilla (manufactured by Sanei Kagaku K. K.) and mixed uniformly to prepare an ice cream mix. The obtained ice cream mix was aged a whole day and night and frozen by means of a freezer with 2 linked cylinders (Model KMLT 318, having 3 cylinders; manufactured by Crepaco Co.) under the following conditions to obtain about 220 kg of an ice cream having a property of excellent meltdown in the mouth.

Supplying temperature of an ice cream mix:5° C.
Flow of an ice cream mix:300 l/hour
Overrun in a first cylinder:10%
Drawing temperature in a first cylinder:−5.0° C.
Overrun in a second cylinder:120%
Drawing temperature in a second cylinder:−6.5° C.

EXAMPLE 2

To 191.37 kg of water were added 18.0 kg of unsalted butter (manufactured by Morinaga Milk Industry Co., Ltd.), 25.5 kg of skim milk powder (manufactured by Morinaga Milk Industry Co., Ltd.), 45.0 kg of purified sucrose (manufactured by Toyo Seito K. K.), 18.0 kg of hydrolyzed starch powder (manufactured by Showa Sangyo K. K.) and 1.8 kg of an emulsifier and stabilizer (Sunnice N, manufactured by Sanei Kagaku), and dissolved or mixed uniformly. The resultant mixture was heated to 60 ° C. and homogenized at 2 stages (150 kg/cm$^2$ and 50 kg/cm$^2$), pasteurized at 85° C. for 15 seconds and cooled to 5° C. To the resultant mixture were added 0.03 kg of a color (Sunyellow No. 2, manufactured by Sanei Kagaku K. K.) and 0.3 kg of vanilla (manufactured by Sanei Kagaku K. K.) and mixed uniformly to prepare an ice cream mix. The obtained ice cream mix was aged a whole day and night and frozen by means of a freezer with 2 linked cylinders (Model KMLT 318, having 3 cylinders; manufactured by Crepaco Co.) under the following conditions to obtain about 235 kg of ice milk having a property of excellent meltdown in the mouth.

Supplying temperature of an ice cream mix:5.0° C.
Flow of an ice cream mix:280 l/hour
Overrun in a first cylinder:15%
Drawing temperature in a first cylinder:−4.0° C.
Overrun in a second cylinder:80%
Drawing temperature in a second cylinder:−5.0° C.

EXAMPLE 3

To 50.55 kg of water were added 108.0 kg of ⅓ concentrated milk (manufactured by Morinaga Milk Industry Co., Ltd.), 78.0 kg of 45% cream (manufactured by Morinaga Milk Industry Co., Ltd.), 45.0 kg of purified sucrose (manufactured by Toyo Seito K. K.), 6.0 kg of hydrolyzed starch powder (manufactured by Showa Sangyo K. K.) and 12.0 kg of egg yolks (manufactured by Taiyo Kagaku K. K.), and dissolved or mixed uniformly. The resultant mixture was heated to 60° C. and homogenized at 2 stages (150 kg/cm$^2$ and 50 kg/cm$^2$), pasteurized at 85° C. for 15 seconds and cooled to 5° C. To the resultant mixture was added 0.45 kg of vanilla (manufactured by Sanei Kagaku K. K.) and mixed uniformly to prepare an ice cream mix. The obtained ice cream mix was aged a whole day and night and frozen by means of a freezer with 2 linked cylinders (Model KMLT 318, having 3 cylinders; manufactured by Crepaco Co.) under the following conditions to obtain about 215 kg of an ice cream having a property of excellent meltdown in the mouth.

Supplying temperature of an ice cream mix:5.5° C.
Flow of an ice cream mix:250 l/hour
Overrun in a first cylinder:5%
Drawing temperature in a first cylinder:−4.5° C.
Overrun in a second cylinder:30%
Drawing temperature in a second cylinder:−6.0° C.

EXAMPLE 4

To 179.52 kg of water were added 24.0 kg of refined coconut oil (manufactured by Fuji Seiyu K. K.), 31.5 kg of skim milk powder (manufactured by Morinaga Milk Industry Co., Ltd.), 45.0 kg of purified sucrose (manufactured by Toyo Seito K. K.), 18.0 kg of hydrolyzed starch powder (manufactured by Showa Sangyo K. K.) and 1.5 kg of an emulsifier and stabilizer (Sunnice N, manufactured by Sanei Kagaku K. K.), and dissolved or mixed uniformly. The resultant mixture was heated to 60° C. and homogenized at 2 stages (150 kg/cm$^2$ and 50 kg/cm$^2$), pasteurized at 85° C. for 15 seconds and cooled to 5° C. To the resultant mixture were added 0.03 kg of a color (Sunyellow No. 2, manufactured by Sanei Kagaku K. K.) and 0.45 kg of vanilla (manufactured by Sanei Kagaku K. K.) and mixed uniformly to prepare an ice cream mix. The obtained ice cream mix was aged a whole day and night and frozen by means of a freezer with 2 linked cylinders (Model KMLT 318, having 3 cylinders; manufactured by Crepaco Co.) under the following conditions to obtain about 245 kg of lacto-ice having a property of excellent meltdown in the mouth.

Supplying temperature of an ice cream mix:5.5° C.
Flow of an ice cream mix:280 l/hour
Overrun in a first cylinder:10%
Drawing temperature in a first cylinder: −5.5° C.
Overrun in a second cylinder:100%
Drawing temperature in a second cylinder:−6.5° C.

(Examples 5–8: Production of an ice cream having a property of softness even at a freezing temperature)

EXAMPLE 5

To 134.37 kg of water were added 60.0 kg of raw milk, 26.4 kg of unsalted butter (manufactured by Morinaga Milk Industry Co., Ltd.), 26.4 kg of skim milk powder (manufactured by Morinaga Milk Industry Co., Ltd.), 39.0 kg of purified sucrose (manufactured by Toyo Seito K. K.), 12.0 kg of hydrolyzed starch powder (manufactured by Showa Sangyo K. K.) and 1.5 kg of an emulsifier and stabilizer (Sunnice N, manufactured by Sanei Kagaku K. K.), and mixed and dissolved uniformly. The resultant mixture was heated to 60° C., homogenized at 2 stages (150 kg/cm$^2$ and 50 kg/cm$^2$), pasteurized at 85° C. for 15 seconds and cooled to 5° C. To the resultant mixture were added 0.03 kg of a color (Sunyellow No. 2, manufactured by Sanei Kagaku K. K.) and 0.3 kg of vanilla (manufactured by Sanei Kagaku K. K.) and mixed uniformly to prepare an ice cream mix. The obtained ice cream mix was aged a whole day and night.

Then, using a continuous freezer with 2 linked cylinders (Model KMLT 318, having 3 cylinders; manufactured by Crepaco Co.), a freezing treatment of the ice cream mix was carried out under the following conditions, by supplying the ice cream mix to a first cylinder, an overrun was given to the ice cream mix in the first cylinder and the resultant ice cream mix was transferred to a second cylinder, mixing and kneading the said mix in the second cylinder.

Supplying temperature of an ice cream mix:4.5° C.
Flow of an ice cream mix:300 l/hour
Overrun in a first cylinder:30%
Drawing temperature in a first cylinder:−5.5° C.
Mixing and kneading temperature in a second cylinder:−5.8° C.

Then, the ice cream mix was hardened according to an ordinary method to obtain about 220 kg of an ice cream having a property of excellent softness in the mouth even at a freezing temperature.

EXAMPLE 6

To 191.37 kg of water were added 18.0 kg of unsalted butter (manufactured by Morinaga Milk Industry Co., Ltd.), 25.5 kg of skim milk powder (manufactured by Morinaga Milk Industry Co., Ltd.), 45.0 kg of purified sucrose (manufactured by Toyo Seito K. K.), 18.0 kg of hydrolyzed starch powder (manufactured by Showa Sangyo K. K.) and 1.8 kg of an emulsifier and stabilizer (Sunnice N, manufactured by Sanei Kagaku K. K.), and mixed and dissolved uniformly. The resultant mixture was heated to 60° C. and homogenized at 2 stages (150 kg/cmÜ and 50 kg/cm$^2$), pasteurized at 85° C. for 15 seconds and cooled to 5° C. To the resultant mixture were added 0.03 kg of a color (Sunyellow No. 2, manufactured by Sanei Kagaku K. K.) and 0.3 kg of vanilla (manufactured by Sanei Kagaku K. K.) and mixed uniformly to prepare an ice cream mix. The obtained ice cream mix was aged a whole day and night.

Then, using a continuous freezer with 2 linked cylinders (Model KMLT 318, having 3 cylinders; manufactured by Crepaco Co.), a freezing treatment of the ice cream mix was carried out under the following conditions in the same manner as in Example 5.

Supplying temperature of an ice cream mix:5.0° C.
Flow of an ice cream mix:280 l/hour
Overrun in a first cylinder:80%
Drawing temperature in a first cylinder:−4.0° C.
Mixing and kneading temperature in a second cylinder:−4.4° C.

Then, the ice cream mix was hardened according to an ordinary method to obtain about 235 kg of an ice cream having a property of excellent softness in the mouth even at a freezing temperature.

EXAMPLE 7

To 50.55 kg of water were added 108.0 kg of ⅓ concentrated milk (manufactured by Morinaga Milk Industry Co., Ltd.), 78.0 kg of 45% cream (manufactured by Morinaga Milk Industry Co., Ltd.), 45.0 kg of purified sucrose (manufactured by Toyo Seito K. K.), 6.0 kg of hydrolyzed starch powder (manufactured by Showa Sangyo K. K.) and 12.0 kg of egg yolks (manufactured by Taiyo Kagaku K. K.), and mixed and dissolved uniformly. The resultant mixture was heated to 60° C., homogenized at 2 stages (150 kg/cm$^2$ and 50 kg/cm$^2$), pasteurized at 85° C. for 15 seconds and cooled to 5° C. To the resultant mixture was added 0.45 kg of vanilla (manufactured by Sanei Kagaku K. K.) and mixed uniformly to prepare an ice cream mix. The obtained ice cream mix was aged a whole day and night.

Then, using a continuous freezer with 2 linked cylinders (Model KMLT 318, having 3 cylinders; manufactured by Crepaco Co.), a freezing treatment of the ice cream mix was carried out under the following conditions in the same manner as in Example 5.

Supplying temperature of an ice cream mix:5.5° C.
Flow of an ice cream mix:250 l/hour
Overrun in a first cylinder:15%
Drawing temperature in a first cylinder:−4.5° C.
Mixing and kneading temperature in a second cylinder:−5.0° C.

Then, the ice cream mix was hardened according to an ordinary method to obtain about 215 kg of an ice cream having a property of excellent softness in the mouth even at a freezing temperature.

EXAMPLE 8

To 179.52 kg of water were added 24.0 kg of refined coconut oil (manufactured by Fuji Seiyu K. K.), 31.5 kg of skim milk powder (manufactured by Morinaga Milk Industry Co., Ltd.), 45.0 kg of purified sucrose (manufactured by Toyo Seito K. K.), 18.0 kg of hydrolyzed starch powder (manufactured by Showa Sangyo K. K.) and 1.5 kg of an emulsifier and stabilizer (Sunnice N, manufactured by Sanei Kagaku K. K.), and mixed and dissolved uniformly. The resultant mixture was heated to 60° C., homogenized at 2 stages (150 kg/cm$^2$ and 50 kg/cm$^2$), pasteurized at 85° C. for 15 seconds and cooled to 5° C. To the resultant mixture were added 0.03 kg of a color (Sunyellow No. 2, manufactured by Sanei Kagaku K. K.) and 0.45 kg of vanilla (manufactured by Sanei Kagaku K. K.) and mixed uniformly to prepare an ice cream mix. The obtained ice cream mix was aged a whole day and night.

Then, using a continuous freezer with 2 linked cylinders (Model KMLT 318, having 3 cylinders; manufactured by Crepaco Co.), a freezing treatment of the ice cream mix was carried out under the following conditions in the same manner as in Example 5.

Supplying temperature of an ice cream mix:5.5° C.
Flow of an ice cream mix:280 l/hour
Overrun in a first cylinder:120%
Drawing temperature in a first cylinder:−5.5° C.
Mixing and kneading temperature in a second cylinder:−5.7° C.

Then, the ice cream mix was hardened according to an ordinary method to obtain about 245 kg of an ice cream having a property of excellent softness in the mouth even at a freezing temperature.

(Examples 9–11: Production of an ice cream in which a part of an ice cream mix is supplied additionally)

EXAMPLE 9

To 50.55 kg of water were added 108.0 kg of 1/3 concentrated milk (manufactured by Morinaga Milk Industry Co., Ltd.), 45.0 kg of purified sucrose (manufactured by Toyo Seito K. K.), 6.0 kg of hydrolyzed starch powder (manufactured by Showa Sangyo K. K.) and 12.0 kg of egg yolks (manufactured by Taiyo Kagaku K. K.), and mixed and dissolved uniformly. The resultant mixture was heated to 60° C., homogenized at 2 stages (150 kg/cm$^2$ and 50 kg/cm$^2$), pasteurized at 85° C. for 15 seconds and cooled to 5° C. To the resultant mixture was added 0.45 kg of vanilla (manufactured by Saneigen FFI K. K.) and mixed uniformly to prepare about 222 kg of a part of an ice cream mix. The obtained ice cream mix was aged in a tank a whole day and night.

On the other hand, as the rest of an ice cream mix, 78.0 kg of 45% cream (manufactured by Morinaga Milk Industry Co., Ltd.) pasteurized at 85° C. for 15 seconds was prepared, and cooled to 5° C., and then aged in another tank a whole day and night.

To the site between a first cylinder and a second cylinder of the cylinders of 2 connected continuous freezers (Model KMLT 318, manufactured by Crepaco Co.) was linked a sanitary pipe with a diameter of 1.5 inches in a Y-form from the tank for storing the rest of an ice cream mix by means of a positive displacement pump (manufactured by APV Co.). To the site just behind the place of the said connection was set a static mixer (manufactured by Noritake Co., Ltd.). The first cylinder were operated in cooperation with the positive displacement pump. Thus, an apparatus which can control the drawing amount of a part of an ice cream mix from the first cylinder and the supplying amount of the rest of an ice cream mix from the positive displacement pump precisely was made on an experimental basis.

A freezing treatment was carried out under the following conditions as follows: the said part of an ice cream mix was supplied in the first cylinder, frozen in the first cylinder and drawn from the first cylinder, and the said rest of an ice cream mix was supplied from the positive displacement pump, mixed by a static mixer and transferred to the second cylinder, and an overrun was given to the resultant mixture in the second cylinder, and then the whole ice cream mix was refrozen. Then, the obtained ice cream mix was hardened according to an ordinary method to obtain about 235 kg of an ice cream having thick creamy flavor and good mouthfeel.

Supplying temperature of a part of an ice cream mix:4.5° C.
Supplying temperature of the rest of an ice cream mix:5.5° C.
Flow of part of an ice cream mix and the rest of it at mixing 300 l/hour
Supplying amount of the rest of an ice cream mix:85 l/hour
Overrun in a first cylinder:0%
Drawing temperature in a first cylinder: −4.0° C.
Overrun in a second cylinder:30%
Drawing temperature in a second cylinder:−5.5° C.

EXAMPLE 10

To 179.31 kg of water were added 18.0 kg of unsalted butter (manufactured by Morinaga Milk Industry Co., Ltd.), 25.5 kg of skim milk powder (manufactured by Morinaga Milk Industry Co., Ltd.), 27.0 kg of purified sucrose (manufactured by Toyo Seito K. K.), 18.0 kg of hydrolyzed starch powder (manufactured by Showa Sangyo K. K.) and 1.8 kg of an emulsifier and stabilizer (Sunnice N, manufactured by Saneigen FFI K. K.), and mixed and dissolved uniformly. The resultant mixture was heated to 60° C., homogenized at 2 stages (150 kg/cm$^2$ and 50 kg/cm$^2$), pasteurized at 85° C. for 15 seconds and cooled to 5° C. To the resultant mixture were added 0.03 kg of a color (Sunyellow No. 2, manufactured by Saneigen FFI K. K.) and 0.36 kg of vanilla (manufactured by Saneigen FFI K. K.) and mixed uniformly to prepare about 270 kg of part of an ice cream mix. The resultant ice cream mix was aged a whole day and night.

On the other hand, as the rest of an ice cream mix, 30.0 kg of sweetened condensed milk (manufactured by Morinaga Milk Industry Co., Ltd.) was prepared, and cooled to 5° C., and then aged in another tank in the same manner a whole day and night.

An apparatus identical with that of Example 9 was made on an experimental basis except that the positive displacement pump was replaced by a monopump (manufactured by Heishin Sobi K. K.), and that a diameter of a pipe was changed to 1 inch.

A freezing treatment of the said mix was carried out under the following conditions as follows: the said part of an ice cream mix was supplied in a first cylinder, frozen in the first cylinder and drawn from the first cylinder, and the said rest of an ice cream mix was supplied from the said pump, mixed by a static mixer and transferred to a second cylinder, and an overrun was given to the resultant mixture in the second cylinder, and then the whole ice cream mix was refrozen. Then, the obtained ice cream mix was hardened according to an ordinary method to obtain about 215 kg of an ice cream having thick condensed milk flavor and good mouthfeel.

Supplying temperature of a part of an ice cream mix:5.5° C.
Supplying temperature of the rest of an ice cream mix:7.5° C.
Flow of a part of an ice cream mix and the rest of it at mixing: 305 l/hour
Supplying amount of the rest of an ice cream mix:24 l/hour
Overrun in a first cylinder:60%
Drawing temperature in a first cylinder:−4.8° C.
Overrun in a second cylinder:100%
Drawing temperature in a second cylinder:−5.5° C.

EXAMPLE 11

To 169.66 kg of water were added 9.0 kg of skim milk powder (manufactured by Morinaga Milk Industry Co., Ltd.), 9.0 kg of refined coconut oil (manufactured by Fuji Seiyu K. K.), 57.0 kg of purified sucrose (manufactured by Toyo Seito K. K.), 18.0 kg of hydrolyzed starch powder (manufactured by Showa Sangyo K. K.) and 1.8 kg of an emulsifier and stabilizer (Sunnice N, manufactured by Saneigen FFI K. K.), and mixed and dissolved uniformly. The resultant mixture was heated to 60° C., homogenized at 2 stages (150 kg/cm$^2$ and 50 kg/cm$^2$), pasteurized at 85 ° C. for 15 seconds and cooled to 5° C. To the resultant mixture were added 0.09 kg of a color (Carotenebase 9400, manufactured by Saneigen FFI K. K.) and 0.45 kg of the essence of orange (manufactured by Saneigen FFI K. K.) and mixed uniformly to prepare 265 kg of a part of an ice cream mix. The obtained ice cream mix was aged a whole day and night.

On the other hand, as the rest of an ice cream mix, 35.0 kg of 1/5 Unshu orange condensed juice (manufactured by Ehime-ken Fruit Growers Cooperative Association) was prepared, and cooled to 5° C., and then aged in another tank in the same manner a whole day and night.

An apparatus identical with that of Example 9 was made on an experimental basis except that a diameter of a pipe linked to a positive displacement pump was changed to 1 inch.

A freezing treatment of the said mix was carried out under the following conditions as follows: the said part of an ice cream mix was supplied in a first cylinder, frozen in the first cylinder and drawn from the first cylinder, and the said rest of an ice cream mix was supplied from the positive displacement pump, mixed by a static mixer and transferred to a second cylinder, and an overrun was given to the resultant mixture in the second cylinder, and then the whole ice cream mix was refrozen. Then, the obtained ice cream mix was hardened according to an ordinary method to obtain about 220 kg of an ice cream having thick juicy flavor, no curd and good mouthfeel.

Supplying temperature of a part of an ice cream mix:5.5° C.
Supplying temperature of the rest of an ice cream mix:6.0° C.
Flow of a part of an ice cream mix and the rest of it at mixing:280 l/hour
Supplying amount of the rest of an ice cream mix:30.8 l/hour
Overrun in a first cylinder:0%
Drawing temperature in a first cylinder:−4.5° C.
Overrun in a second cylinder:60%
Drawing temperature in a second cylinder:−6.0° C.

EXAMPLE 12

To 192.6 kg of water were added 27.0 kg of purified sucrose (manufactured by Toyo Seito K. K.), 15.0 kg of hydrolyzed starch powder (manufactured by Showa Sangyo K. K.) and 1.5 kg of an emulsifier and stabilizer (Sunnice N, manufactured by Saneigen FFI K. K.), and mixed and dissolved uniformly. The resultant mixture was heated to 60° C., homogenized at a stage of 50 kg/cm$^2$, pasteurized at 85° C. for 15 seconds and cooled to 5° C. To the resultant mixture were added 18.0 kg of 1/5 Unshu orange condensed juice (manufactured by Ehime-ken Fruit Growers Cooperative Association), 0.15 kg of a color (Carotenebase 9400, manufactured by Saneigen FFI K. K.) and 0.45 kg of the essence of orange (manufactured by Saneigen FFI K. K.) and mixed uniformly to prepare 225 kg of a part of an ice cream mix. The obtained ice cream mix was aged a whole day and night.

On the other hand, as the rest of an ice cream mix, 45.0 kg of high fructose corn syrup (manufactured by Sanmatsu Kogyo K. K.) was prepared, and cooled to 5° C., and then aged in another tank in the same manner a whole day and night.

An apparatus identical with that of Example 9 was made on an experimental basis except that a diameter of a pipe linked to a positive displacement pump was changed to 1 inch.

A freezing treatment was carried out under the following conditions as follows: the said part of an ice cream mix was supplied in a first cylinder, frozen in the first cylinder and drawn from the first cylinder, and the said rest of an ice cream mix was supplied from the positive displacement pump, mixed by a static mixer and transferred to a second cylinder, and an overrun was given to the resultant mixture in the second cylinder, and then the whole ice cream mix was refrozen. Then, the obtained ice cream mix was hardened according to an ordinary method to obtain about 230 kg of an ice cream having a property of excellent meltdown in the mouth and a property of excellent softness in the mouth.

Supplying temperature of a part of an ice cream mix:5.0° C.
Supplying temperature of the rest of an ice cream mix:5.5° C.
Flow of a part of an ice cream mix and the rest of it at mixing:270 l/hour
Supplying amount of the rest of an ice cream mix:30.1 l/hour
Overrun in a first cylinder:0%
Drawing temperature in a first cylinder:−4.5° C.
Overrun in a second cylinder:40%
Drawing temperature in a second cylinder:−5.0° C.

Although the foregoing invention has been described in some detail by way of illustration and examples for purposes of clarity of understanding, it will be obvious that certain changes and modifications may be practiced within the scope of the appended claims.

What is claimed is:

1. An ice cream having air cells therein and having a property of excellent meltdown in the mouth, a fat content of 5 to 18% by weight and an overrun of 10 to 150% by weight, wherein at least 80% of the air cells in the ice cream have a diameter of 60 μm or more, the ice cream being prepared such that the air cell diameters are retained without collapsing until meltdown in the mouth and without forming ice particles.

2. The ice cream of claim 1, wherein at least 90% of the air cells have a diameter of 60 μm or more.

3. The ice cream of claim 1, further comprising 3–12% by weight milk fat and 8–20% by weight sugar.

4. A process for producing an ice cream having a property of excellent meltdown in the mouth, which comprises incorporating air into an ice cream mix, which contains 5 to 18% by weight of fat, in a first cylinder of a freezer at a temperature of −3.0° to −6.0° C. to give an overrun of 20% by weight or less, then incorporating air into said mix in a second cylinder of a freezer at a temperature of −3.0° to −8.0° C. to given an overrun of 10 to 150% by weight, to produce an ice cream containing air cells wherein at least 8% of the total air cells have a diameter of 60 μm or more.

5. The process of claim 4, wherein the temperature in the first cylinder of the freezer is a temperature of −4.5° to −6.0° C.

6. The process of claim 4, wherein the overrun given by the first cylinder is 0–10% by weight.

7. The process of claim 4, wherein the temperature in the second cylinder of the freezer is −5.0° to −8.0° C.

8. The process of claim 4, wherein the overrun given by the second cylinder is 20 to 120% by weight.

9. A process for producing an ice cream, capable of preventing flavor deterioration, uniformly mixing high-acid components and freely controlling the size of ice crystals, which comprises freezing a first part of an ice cream mix in a first cylinder of the cylinders of two linked continuous freezers, transferring the frozen ice cream mix to a second cylinder, supplying a second part of the ice cream mix to a pipeline between the first cylinder and the second cylinder to produce a final ice cream mix, and then refreezing the final ice cream mix in the second cylinder, wherein said second part of the ice cream mix comprises a high-acid material.

10. A process for producing an ice cream, capable of preventing flavor deterioration, uniformly mixing cream or egg components and freely controlling the size of ice crystals, which comprises freezing a first part of an ice cream mix in a first cylinder of the cylinders of two linked continuous freezers, transferring the frozen ice cream mix to a second cylinder, supplying a second part of the ice cream mix to a pipeline between the first cylinder and the second cylinder to produce a final ice cream mix, and then refreezinq the final ice cream mix in the second cylinder, wherein said second part of the ice cream mix comprises at least one of cream or eggs.

* * * * *

UNITED STATES PATENT AND TRADEMARK OFFICE
CERTIFICATE OF CORRECTION

PATENT NO. : 5,403,611
DATED : April 4, 1995
INVENTOR(S) : Mamoru TOMITA, et al.

It is certified that error appears in the above-indentified patent and that said Letters Patent is hereby corrected as shown below:

On the title page, Item [30], the second Foreign Application Priority Date should read:

--April 3, 1992--

Signed and Sealed this

Thirtieth Day of May, 1995

Attest:

BRUCE LEHMAN

Attesting Officer   Commissioner of Patents and Trademarks